United States Patent
Zenmei et al.

[11] Patent Number: 5,620,074
[45] Date of Patent: Apr. 15, 1997

[54] ONE WAY CLUTCH

[75] Inventors: Keisaku Zenmei; Shuzo Isozumi, both of Tokyo, Japan

[73] Assignee: Mitsubishi Denki Kabushiki Kaisha, Tokyo, Japan

[21] Appl. No.: 521,296

[22] Filed: Aug. 29, 1995

[30] Foreign Application Priority Data

Jul. 25, 1995 [JP] Japan ................................ 7-189502

[51] Int. Cl.$^6$ .................................... F16D 41/066
[52] U.S. Cl. .................................................. 192/45
[58] Field of Search ...................... 192/42, 45; 188/82.84

[56] References Cited

U.S. PATENT DOCUMENTS 4,178,805  12/1979  Mazzorana ........................ 192/45 X

FOREIGN PATENT DOCUMENTS 60-121328  6/1985  Japan ........................................ 192/45
63-32422   8/1988  Japan .

*Primary Examiner*—Richard M. Lorence
*Attorney, Agent, or Firm*—Sughrue, Mion, Zinn, Macpeak & Seas

[57] ABSTRACT

A one way clutch which permits the contact surfaces 20a of the chucks 20 of a chucking jig for chucking a clutch outer 12 to be easily machined, and the clutch outer has a plurality of taper-shaped cutouts 1a and arc-shaped support surfaces 12a serving as machining reference surfaces, each defined on the inner periphery of the clutch outer. Since the clutch outer is produced by being machined using the support surfaces as a machining reference, the contact surfaces of chucks can be easily machined.

2 Claims, 5 Drawing Sheets

ONE WAY CLUTCH

BACKGROUND OF THE INVENTION

1. Field of the Invention

The present invention relates to a one way clutch used to a starter or an alternator with a clutch.

2. Description of the Related Art

FIG. 3 shows a front elevational view, partly in cross section, of a conventional one way clutch disclosed in, for example, Japanese Utility Model Publication No. 63-32422. FIG. 4 is a view showing a state that the clutch outer of the conventional one way clutch is chucked. Further, FIG. 5 is an enlarged view of the main portion of the clutch outer. In the figures, a clutch outer 1 as a cylindrical driving member coupled with the shaft of a not shown starting motor has cam surfaces 1a as a plurality of taper-shaped cutouts defined on the inner periphery thereof at equal intervals on a circumference.

A cylindrical clutch inner 2 as a driven member is disposed in the clutch outer 1 and defines a wedge-shaped space between the cam surfaces 1a on the inner periphery of the clutch outer 1 and the clutch inner 2. The clutch inner 2 has a pinion 3 at an end thereof which is meshed with the ring gear of a not shown engine. Friction rollers 4 as columnar rollers are movably disposed in the wedge-shaped spaces. Each of the friction rollers 4 is pressed in the narrower direction of the wedge-shaped space by a spring 5 interposed and contracted between the friction roller 4 and the clutch outer 1.

In the conventional one way clutch arranged as described above, when the starting motor is driven and the clutch outer 1 is rotated in the direction of an arrow A, the friction rollers 4 rotate and are forced into the wedge-shaped spaces, so that the friction rollers 4 act as wedges to cause the clutch outer 1 to be coupled with the clutch inner 2 by a friction force. As a result, the clutch outer 1, the clutch inner 2 and the friction rollers 4 are rotated together with each other. Thus, the ring gear of the not shown engine is driven through the pinion 3 disposed at the end of the clutch inner 2 so as to start the engine. After the start of the engine, the above coupling engagement is released, that is, the springs 5 are inversely urged by the friction rollers 4 to release the wedge action so that the clutch inner 2 and the pinion 3 are driven in idle.

In general, the inner periphery of the clutch outer 1 is integrally formed by cold forging, machining by a broaching machine or the like and then the cylindrical portion of the clutch outer 1 is cut by a lathe or the like. The shapes and locations of the respective portions of the clutch outer 1 must be managed with a pinpoint accuracy, respectively, with respect to the cam surfaces 1a for transmitting a force to the friction rollers 4. Therefore, when a cutting operation is carried out on the clutch outer 1, the portions of the cam surfaces 1a formed by cold forging or the like are usually chucked, that is, the other cylindrical portion of the clutch outer 1 is cut using the cam surfaces 1a as a machining reference (FIG. 4).

Since the cam surface 1a is formed to have a taper shape, the center P thereof is dislocated from the center O of the cylinder of the clutch outer 1 (FIG. 5). Since chucks 10 for chucking the portions of the cam surfaces 1a must cause the contact surfaces 10a thereof to come into intimate contact with the cam surfaces 1a, each contact surface 10a must be formed to a shape tracing the cam surface 1a, so that the center of the approximately arc-shaped contact surface 10a is dislocated from the center of rotation Q of the chuck. Consequently, it is not easy to machine the contact surfaces 10a of the chucks 10, and further since there are a plurality of the cam surfaces 1a, it is difficult to finish the individually machined chucks 10 with a pinpoint accuracy as a whole. In addition, since the cam surface 1a is formed to the taper shape, a skill is required to chuck the clutch outer 1 by a chucking jig without eccentrically locating it and thus the workability of a chucking job is not good.

SUMMARY OF THE INVENTION

An object of the present invention made to solve the above problem is to provide a one way clutch which causes the chuck contact surface of a chucking jig for chucking a clutch outer to be machined easily and includes a clutch outer capable of being chucked easily.

To achieve the above object, there is provided in accordance with the present invention a one way clutch which comprises a cylindrical driving member having a plurality of taper-shaped cutouts and arc-shaped support surfaces serving as machining reference surfaces, each defined on the inner periphery of the driving member, a driven member disposed to form wedge-shaped spaces between the driven member and the inner periphery of the driving member, and rollers movably disposed in the wedge-shaped spaces, respectively, wherein power is transmitted in only one rotational direction from the driving member to the driven member through the rollers.

DESCRIPTION OF PREFERRED EMBODIMENTS

Embodiment 1

Figure 1:
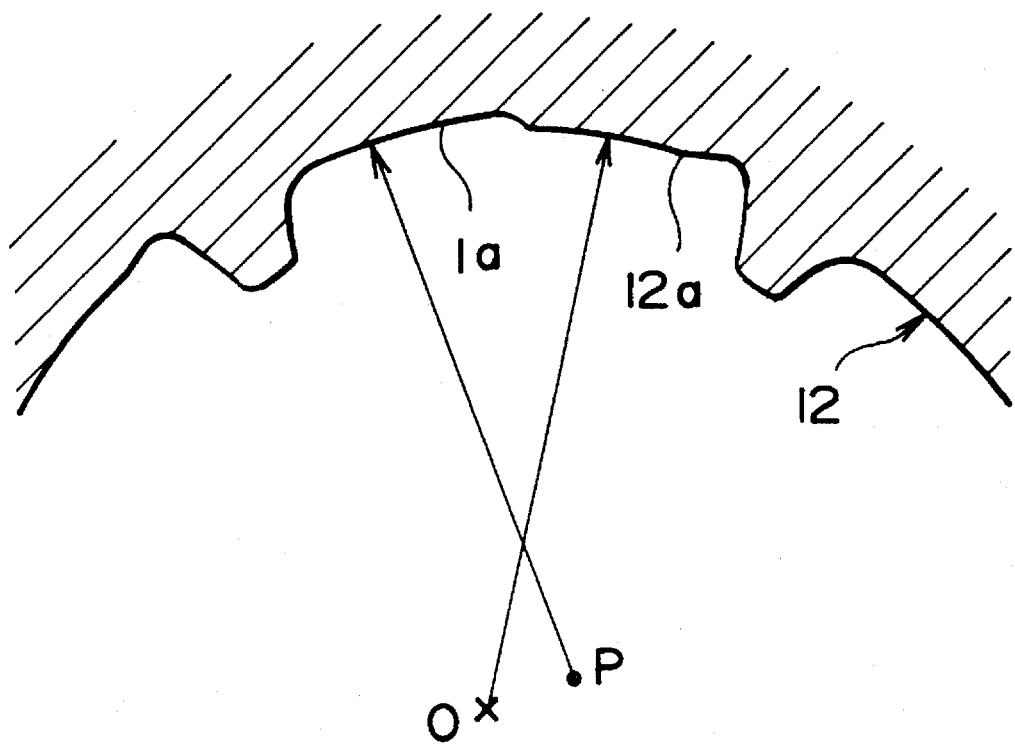
FIG. 1 is an enlarged view of the main portion of a clutch outer of the present invention.
Figure 2:
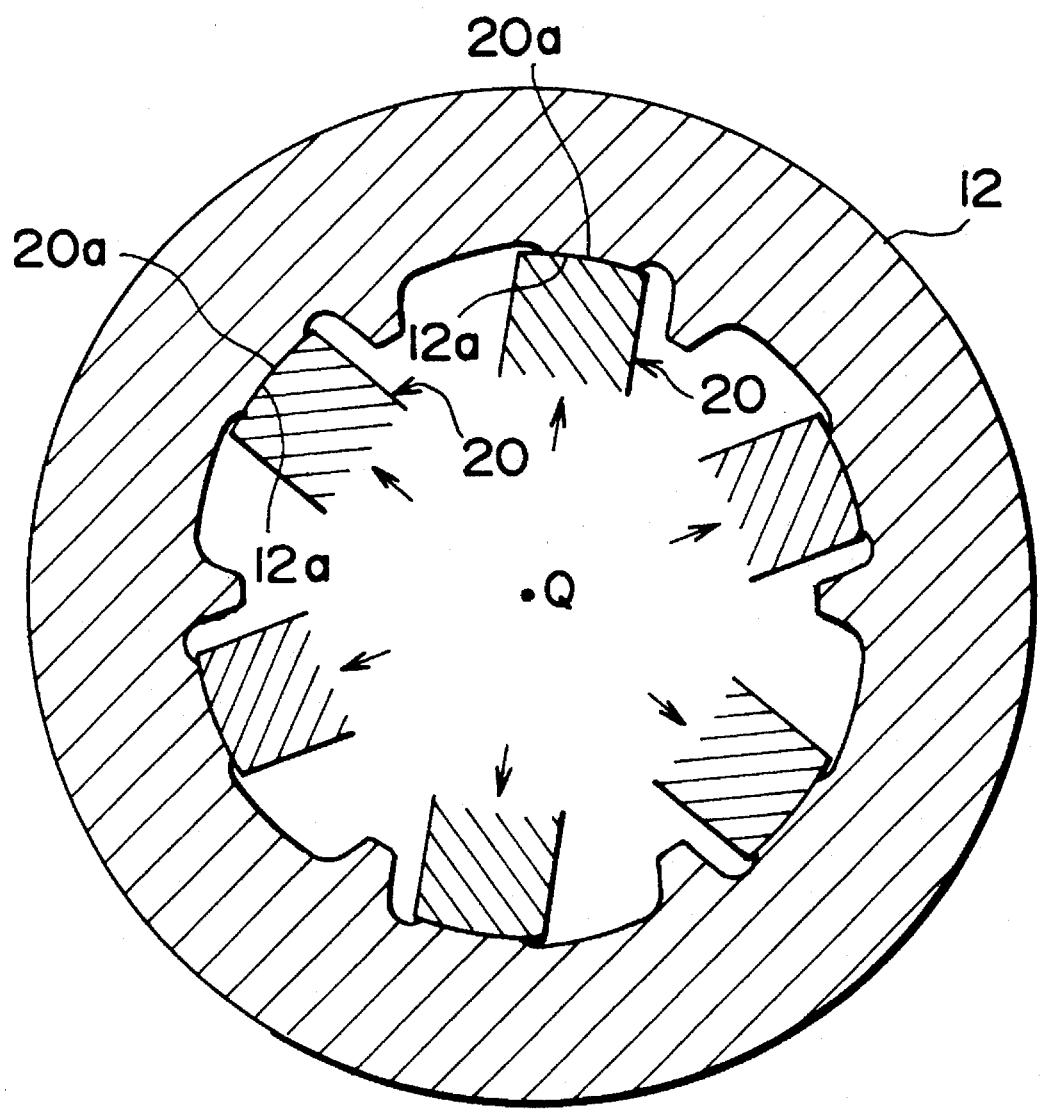
FIG. 2 is a view showing a state that the clutch outer of a one way clutch of the present invention is chucked.
Figure 3:
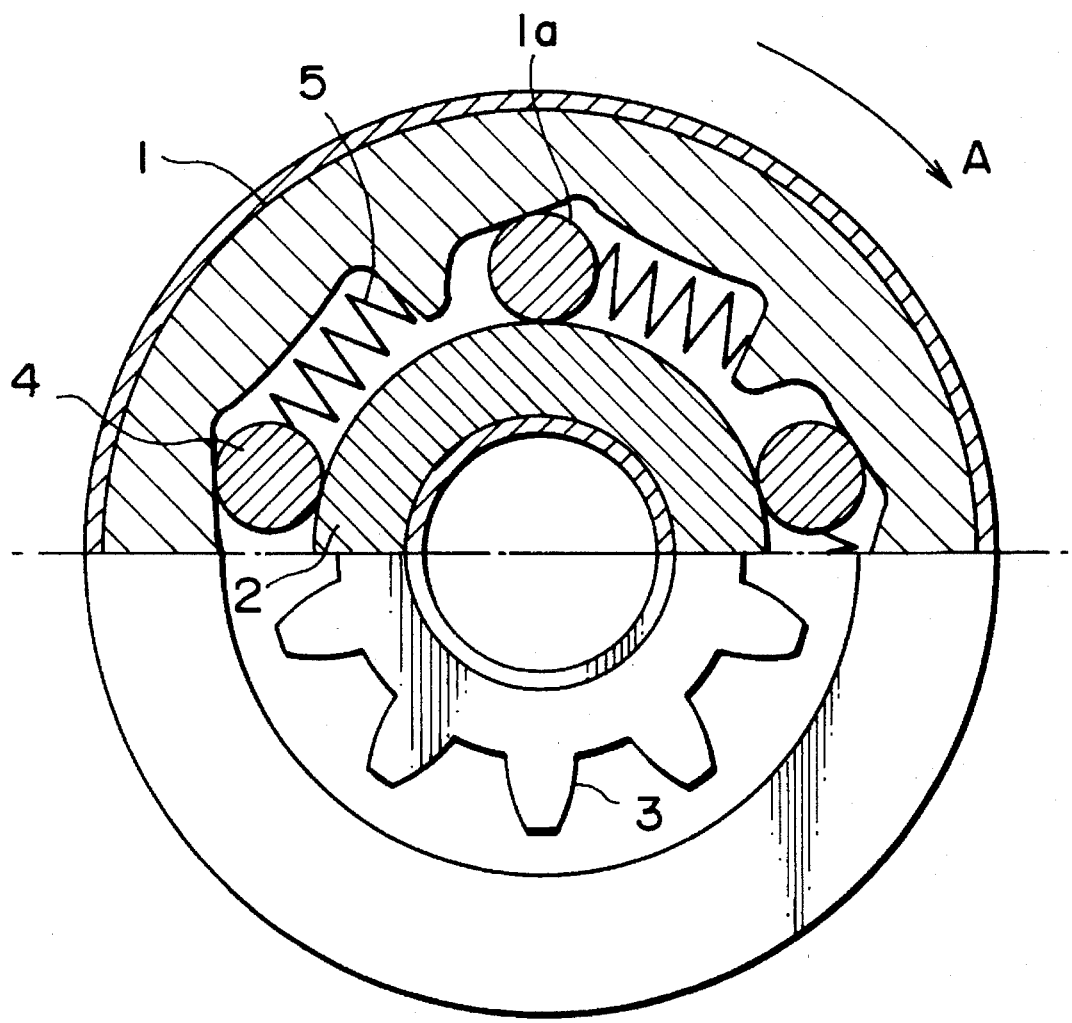
FIG. 3 is a front elevational view, partly in cross section, of a conventional one way clutch.
Figure 4:
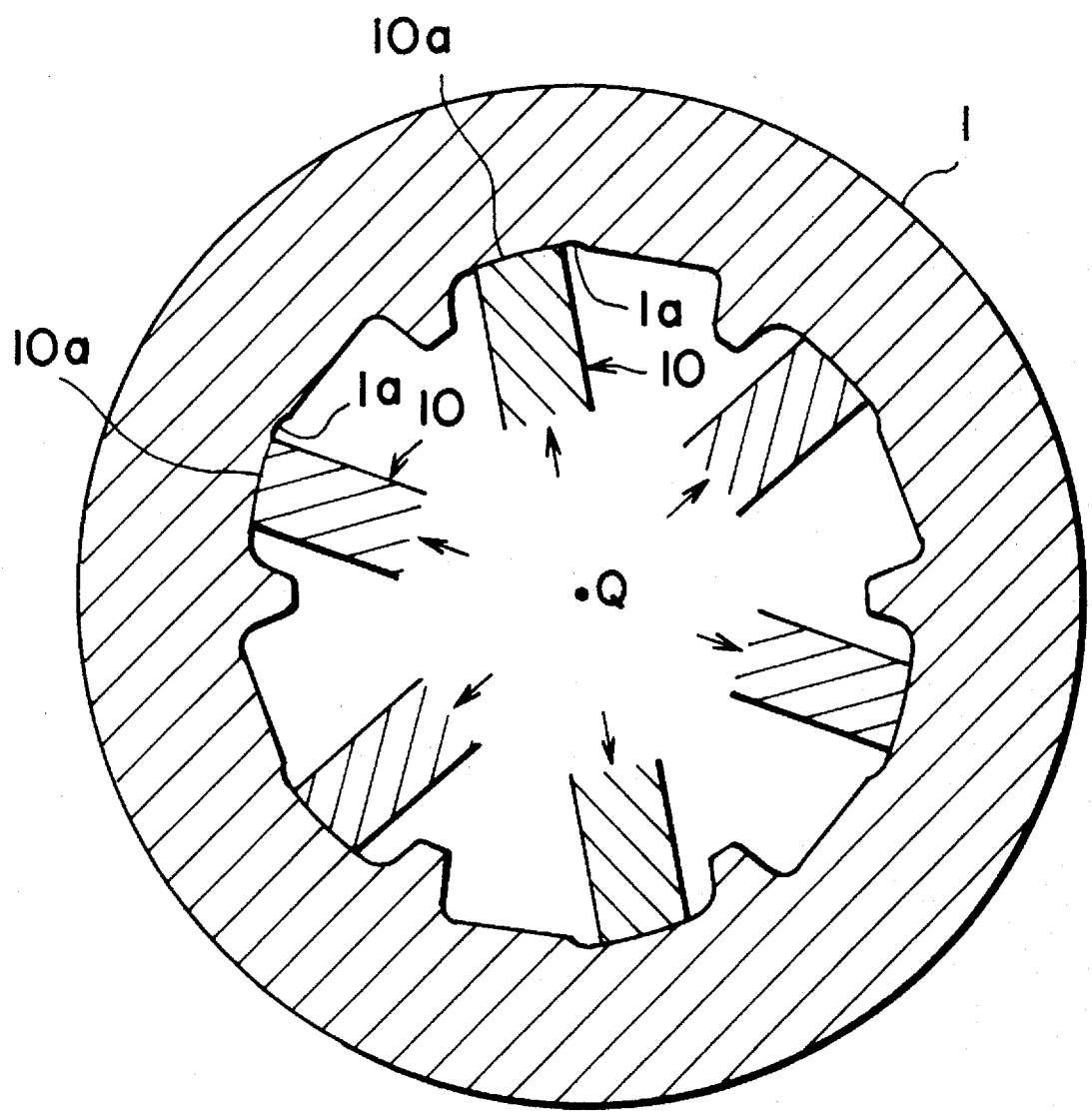
FIG. 4 is a view showing a state that the clutch outer of the conventional one way clutch is chucked.
Figure 5:
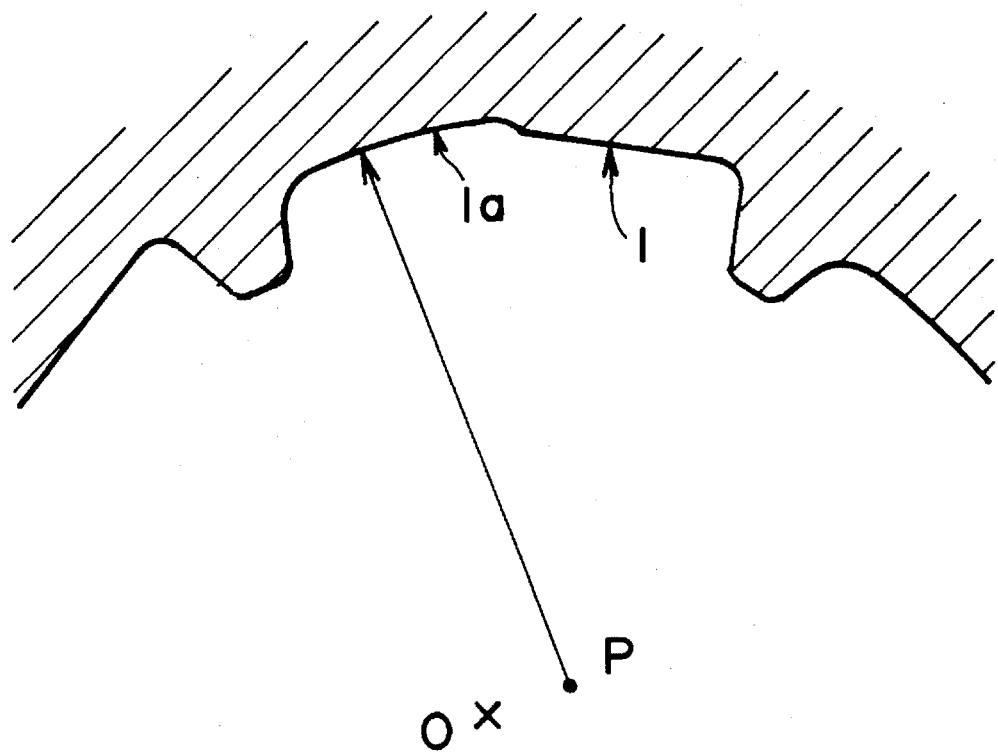
FIG. 5 is an enlarged view of the main portion of the conventional clutch outer.

FIG. 1 is an enlarged view of the main portion of a clutch outer of the present invention and FIG. 2 is a view showing a state that the clutch outer of a one way clutch of the present invention is chucked. In the figures, cam surfaces 1a which are the same as conventional ones are defined on the inner periphery of a clutch outer 12 as a cylindrical driving member. Further, a support surface 12a, which is formed to an arc having its center at the axial center O of the clutch outer 12, is defined between adjacent cam surfaces 1a, 1a on the inner periphery. The one way clutch of the present invention is arranged similarly to the conventional one way clutch shown in FIG. 3 except that the clutch outer 12 arranged as described above is employed. Further, since power is transmitted from the clutch outer 12 to a clutch inner 2 in the same way as that of the conventional one way clutch, the description thereof is omitted here.

Next, a method of machining the clutch outer 12 according to the present invention will be described with reference to FIG. 2. A chucking jig is arranged by assembling chucks 20 having arc-shaped contact surfaces 20a defined at the distal ends thereof so that the center of the arcs of the contact surfaces 20a coincides with the center of rotation Q of the chucking jig. Then, the clutch outer 12 is fixed by the chucks 20 in such a manner that the contact surfaces 20a of the chucks 20 are caused to internally abut against the respective support surfaces 12a of the clutch outer 12 whose cam surfaces 1a and support surfaces 12a are integrally formed by cold forging or machining by a broaching machine.

At the time, the axial center O of the clutch outer 12 coincides with the center of rotation Q of the chucking jig. Next, the respective portions of the clutch outer 12 are cut by rotating the chucking jig so as to machine the clutch outer 12 using the support surfaces 12a as a machining reference.

In the one way clutch of the present invention arranged as described above, since the contact surfaces 20a of the chucks 20 for fixing the clutch outer 12 can be configured as arcs whose centers coincide with the center of rotation Q of the chucking jig, the contact surfaces 20a can be easily produced by being cut by a lathe or the like. Further, since a plurality of the contact surfaces 20a can be simultaneously machined, the respective machined chucks can be easily finished with a pinpoint accuracy as a whole. Furthermore, when the clutch outer 12 is chucked, it can be securely fixed without being eccentrically located without the need of a special skill.

Note, since the cam surfaces 1a and the support surfaces 12a are integrally formed by cold forging or machining by a broaching machine, even if the clutch outer 12 is cut while supported through the support surfaces 12a in place of the cam surfaces 1a, no problem arises in accuracy.

What is claimed is:

1. A one way clutch, comprising:
   a) a cylindrical, outer driving member (12) having a plurality of taper-shaped cutouts (1a) and arc-shaped support surfaces (12a) serving as machining chuck reference surfaces each defined on the inner periphery of said driving member;
   b) a driven member (2) disposed to form wedge-shaped spaces between said driven member and the inner periphery of said driving member; and
   c) a plurality of rollers movably and individually disposed in said wedge-shaped spaces,
   d) wherein power is transmitted only in one rotational direction from said driving member to said driven member through said rollers,
   e) wherein said support surfaces define segments of a circle whose center coincides with the axial center of said driving member such that arc-shaped distal ends (20a) of machining chucks (20) matingly and grippingly engage said circle segments, and
   f) wherein said cutouts and support surfaces are integrally formed.

2. A one way clutch according to claim 1, wherein a plurality of roller biasing springs (5) are individually disposed in spaces defined between said support surfaces and said driven member.

* * * * *